United States Patent [19]

Boomer et al.

[11] 4,310,140

[45] Jan. 12, 1982

[54] PRESSURE-CONTROLLED VALVE WITH SMALL HOLD-UP VOLUME

[75] Inventors: Daryl R. Boomer, Yorba Linda; Russell E. Boyer, Fullerton, both of Calif.

[73] Assignee: Chevron Research Company, San Francisco, Calif.

[21] Appl. No.: 79,906

[22] Filed: Sep. 28, 1979

[51] Int. Cl.³ .................. F16K 31/126; F16L 55/14
[52] U.S. Cl. ........................................ 251/5; 251/61.1
[58] Field of Search .................. 137/12; 251/5, 61.1

[56] References Cited

U.S. PATENT DOCUMENTS

| | | | |
|---|---|---|---|
| 2,706,612 | 4/1955 | Ratelband | 251/5 |
| 3,298,391 | 1/1967 | Savage | 251/5 |
| 3,353,560 | 11/1967 | McCulloch | 251/5 |
| 3,445,085 | 5/1969 | Eckel et al. | 251/5 |
| 3,552,712 | 1/1971 | Whitlock | 251/5 |
| 4,023,772 | 5/1977 | Ratelband | 251/5 |

FOREIGN PATENT DOCUMENTS

| | | | |
|---|---|---|---|
| 1170209 | 3/1964 | Fed. Rep. of Germany | 251/5 |
| 26249 | 12/1953 | Finland | 251/5 |
| 6411144 | 3/1965 | Netherlands | 251/5 |

Primary Examiner—Arnold Rosenthal
Assistant Examiner—G. L. Walton
Attorney, Agent, or Firm—Edward J. Keeling; G. W. Wasson

[57] ABSTRACT

A pressure-controlled valve comprising an elastic-walled conductor, such as a tube, with a flow-obstructing body within the conductor. Fluid flow through the conductor is controlled by expanding the elastic wall away from the flow-obstructing body to provide fluid flow paths and by contracting the elastic-wall of the conductor toward the body to close the flow paths. Expansion and contraction of the elastic-wall of the conductor is in response to the differential pressure between the inside and the outside of the conductor.

8 Claims, 12 Drawing Figures

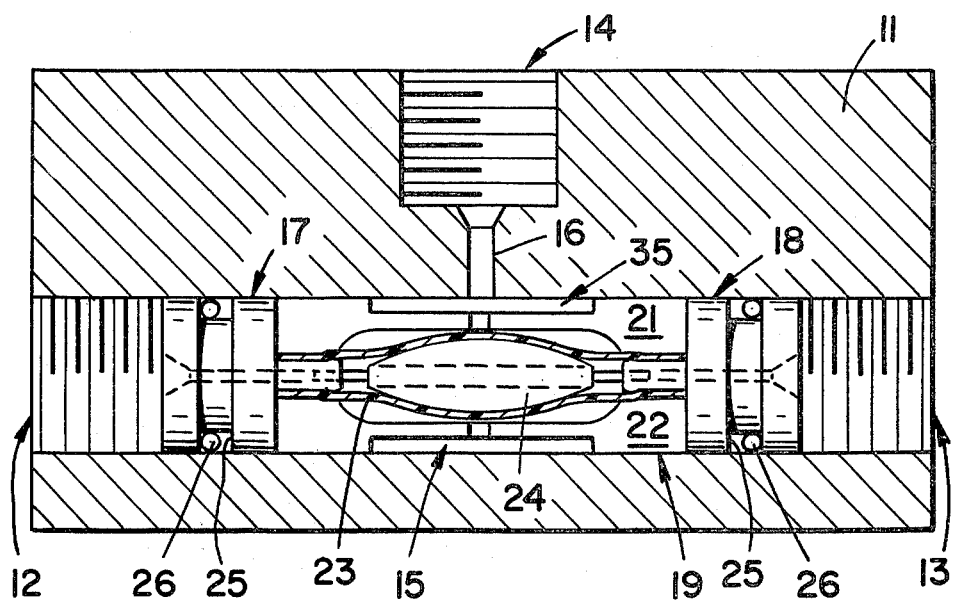
FIG_1
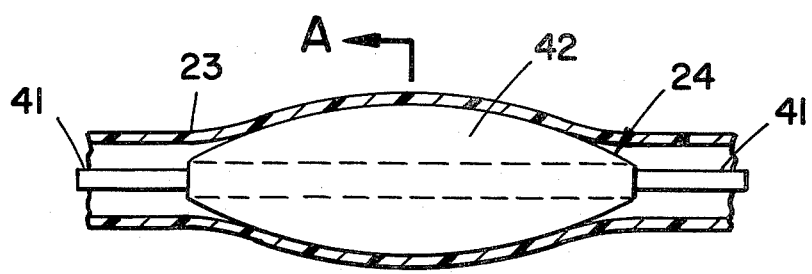
FIG_2
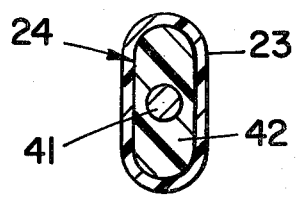
FIG_3
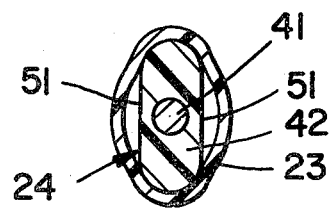
FIG_4

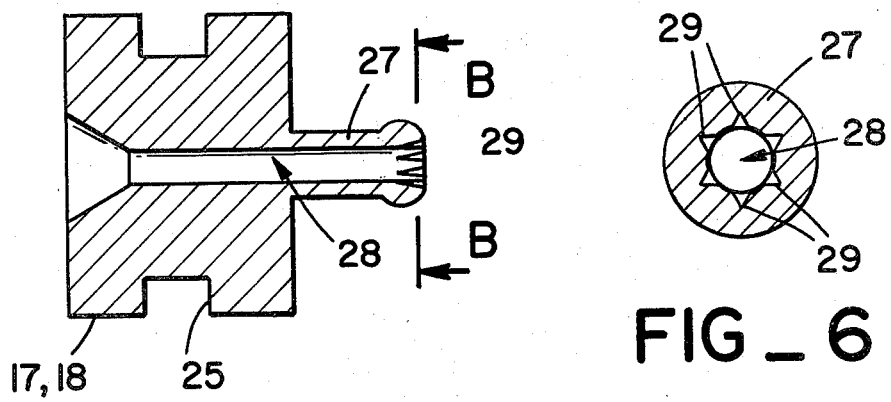
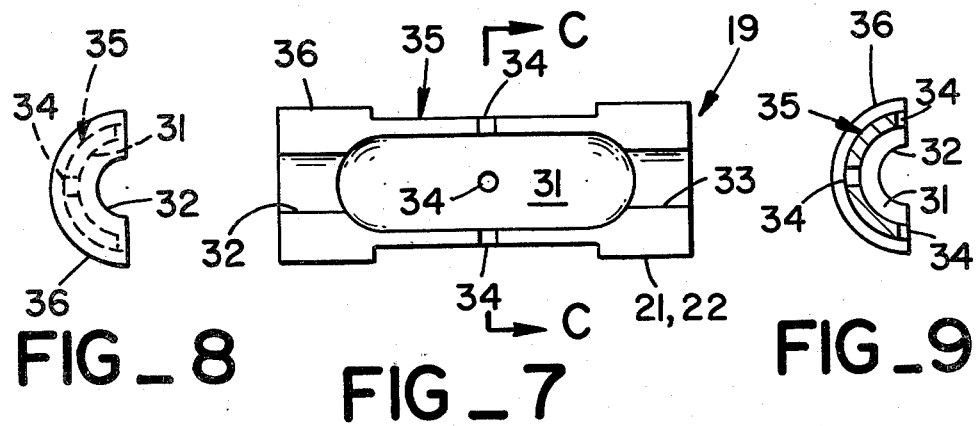
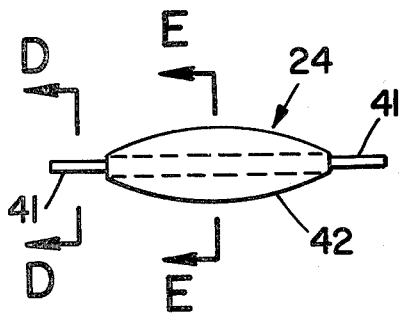

PRESSURE-CONTROLLED VALVE WITH SMALL HOLD-UP VOLUME

BACKGROUND OF THE INVENTION

1. Field of the Invention

This invention relates to a pressure-controlled valve, that is a valve whose flow path is closed when a predetermined static fluid pressure is applied to the control chamber of the valve or a valve where a predetermined differential pressure is employed to cause the valve to operate. Further, the invention relates to a pressure-controlled valve wherein the control is accomplished with a small volume of both control and controlled fluids.

2. Background of the Invention

Prior art pressure-controlled valves which are used to perform a function contemplated by the present invention have required a relatively large "hold-up volume" of the controlled fluid within the pressure-controlled valve. In such valves the valve body itself holds a substantial volume both upstream and downstream from the valve closure point. Such valves require too much "approach volume" and "discharge volume" to be useful in a system wherein the volume of controlled fluid is quite small.

SUMMARY OF THE INVENTION

In accordance with the present invention, flow of fluid stream is controlled by constricting the flow path of the fluid stream. The constriction is accomplished when the differential pressure between the controlled fluid and the controlling fluid causes compression of a circumferential member about the flow path of the controlled fluid. The circumferential member effectively closes the flow path without enclosing a volume of the controlled fluid within the valve and, when the circumferential member is relaxed the flow path is opened to pass controlled fluid without a surge discharge of controlled fluid trapped within the valve.

The valve of the present invention is substantially unlimited in operating pressure in that the control is accomplished within a control chamber where the relative pressure between the controlled fluid and the controlling fluid can be contained by as large or as small a valve body as will be needed to withstand the differential pressure between ambient pressure and the controlled fluid pressure.

In a preferred embodiment of the invention a compressible tube of flexible material provides a flow path surrounding a spreader which functions as a flow obstructing body within the tube. The spreader has a generally oval cross-sectional configuration and a cross-sectional area slightly larger than the internal cross-sectional area of the tube when the tube is in a relaxed state. The tube is stretched about the spreader and is compressible to completely close the flow path through the annular region between the spreader and the tube when a pressure is applied to the exterior of the tube which exceeds the pressure of the fluid flowing within the inside of the tube. The cross-section of the spreader has a smooth circumference so as to avoid creasing of the interior surface of the tube.

BRIEF DESCRIPTION OF THE DRAWINGS

FIG. 1 is an assembly drawing in longitudinal-section illustrating the preferred embodiment of the present invention.

FIG. 2 is a partial sectional view of the valve closure portion of the present invention.

FIG. 3 is a sectional view along the line A—A of FIG. 2 illustrating the valve closure portion in closed position.

FIG. 4 is a sectional view along the line A—A of FIG. 2 illustrating the valve closure portion in open position.

FIG. 5 is a sectional view through the end seal member.

FIG. 6 is a sectional view along the lines B—B of FIG. 5.

FIG. 7 is an elevational view of one part of the valve insert.

FIG. 8 is an end view of FIG. 7.

FIG. 9 is a sectional view along line C—C of FIG. 7.

FIG. 10 is a side elevational view of the tube spreader flow obstructing body.

FIG. 11 is a sectional view along the lines E—E of FIG. 10.

FIG. 12 is a sectional view along the lines D—D of FIG. 10 illustrating an alternative form of the shaft of the spreader element.

DESCRIPTION OF THE PREFERRED EMBODIMENT

The present invention is particularly applicable to the rapid control of very small quantities of a fluid material in a broad range of pressure conditions, for example when the quantity of one fluid material to be added to another system is substantially instantaneously and in minute quantities. The desired speed is accomplished by substantially instantaneous closing off of the flow path of the controlled fluid and the desired small volume of controlled fluid is accomplished by providing a very small flow path with the substantially instantaneous control.

The valve of the present invention is illustrated in assembled form in FIG. 1 wherein a valve body 11 is shown having a threaded inlet port 12, a threaded outlet port 13, and a threaded control inlet port 14. The threads in the ports may be tapered pipe threads or machine threads for cooperation with input and output piping elements. The elements threaded into the input and output ports function to hold the functioning valve elements within the valve body 11 while maintaining a pressure seal within the valve. The valve body 11 is bored between the threaded inlet port 12 and outlet port 13 to provide an internal cylindrical channel 15. The control conduit 16 is machined through the valve body 11 from the bottom of the control inlet port 14 to the channel 15.

The internal cylindrical channel 15 confines the valve operating elements constituting a pair of end seals 17 and 18, an insert 19 comprising a pair of complimentary half members 21 and 22, an elastic-walled tube 23, and a tube spreader flow obstructing body 24. Each of these elements is shown in more detail in other figures of these drawings.

The valve operating elements are assembled within the valve body with the spreader 24 within the tube 23 and the spreader and tube sealed to an extension of the end seals 17 and 18 by being surrounded by and within the insert 21, 22. Piping connected to the valve body holds the operating elements within the body.

As shown in FIG. 5, each end seal, members 17, 18, is formed with a groove at 25 to accommodate an O-ring sealer 26 and has a nipple 27 extending from the surface that will be innermost within the valve body. A hole 28 passes axially through the end seal and the inner face of the nipple 27 at the hole 28 is fluted at 29, as shown in FIG. 6, to prevent the spreader 24 from sealing off the fluid flow.

FIGS. 7, 8 and 9 illustrate the formation of the insert 19 assembled from complimentary half members 21 and 22. The half members are formed with an internal rounded end half cylinder void 31 with end bores 32 and 33 at opposite ends passing axially to the exterior of the assembled spreader. A plurality of radial holes 34 pass through the insert body from the exterior to the internal void 31 and a circumferential groove 35 is removed about the center of the insert while leaving half cylinder shoulders 36 and 37 at opposite ends.

FIGS. 10 and 11 illustrate a preferred form for the spreader 24 here illustrated as having an elliptical form axially along one radial axis and an oval cross-section. The spreader may be constructed with a solid shaft 41 having the elliptical-oval cross-section material 42 fixed to the shaft. One form for construction of the spreader is to heat-shrink a plastics encapsulating tube, formed from a material such as teflon, of the desired configuration onto the solid shaft 41.

The spreader need not have a solid shaft or finger-like extension on the shaft as the spreader may be fixed within the tube at about its center to perform its flow obstructing function.

FIG. 1 illustrates the elements in their assembled position. It should be apparent that the relative sizes of the shafts, holes, tubes, nipples and bores are such that the elements when assembled fit securely within the body of the valve.

The spreader has a dimension axially at its widest part which is slightly larger than the diameter of the tube 23 and the tube and spreader are enough smaller in overall radial dimension to fit within the void portion 31 of the insert 19. The solid shaft 41 of the spreader fits within the fluted entrance of hole 28 within the nipple 27 on the end seals and the fluting within the hole provides fluid flow passageways around the shaft. The tube 23 fits around the outside of the nipple 27 and the complimentary half members 21 and 22 fit around the mounted tube. The contacting end faces of the assembled insert and end seals hold the insert in place. The O-ring around the end seals and the pressure contact between inlet/outlet piping and the end seals maintains the pressure seal of the valve when in operation. The groove 35 and radial holes 34 place the internal chamber formed by the void 31 in pressure communication with the control inlet port 14. When assembled as illustrated, the inside of tube 23 provides a flow path from inlet port 12 to outlet port 13 at the pressure of the inlet fluid stream and the outside of the tube 23 is at the pressure of the control port 14.

FIGS. 2, 3 and 4 illustrate the operation of the control valve of the present invention. FIG. 3 illustrates the tube 23 expanded about the periphery of the spreader 24 as the elements would be positioned when the pressure within the chamber 15 is equal to or greater than the pressure within the tube 23. FIG. 4 illustrates the relative positions of the tube 23 and spreader 24 when the pressure on the inside of the tube is greater than the pressure outside the tube. The tube, having a relaxed cross-section substantially circular, is elongated at the long axis of the oval cross-section of the spreader 24 and expanded outwardly about the short axis of the oval. The space 51 between the spreader 24 and the tube 23 provides a flow path for fluid.

The tube 23 is constructed of a flexible compressible material that can be collapsed about the spreader to effect a fluid-tight seal between the tube and spreader. The relative configuration of the spreader cross-section and the interior of the tube provide a means for effecting rapid operation of the valving function. If the differential pressure expands the tube outwardly from the spreader, passageways 51 are opened at the location of the minimum dimension of the spreader. When opened, fluid flow is substantially instantaneous. Any further increase in the differential pressure merely expands the tube about the spreader. When the differential pressure decreases, the tube is relaxed to collapse about the spreader and, when the outside pressure exceeds the inside pressure, flow through the tube is interrupted.

The valve of the present invention avoids the disadvantage of prior art valves which require an appreciable approach volume and discharge volume in operating and releasing the valve. The valve, therefore, has particular application to the control of fluid streams where very small quantities of fluid are required. Furthermore, the valve configuration permits the valve to be used throughout a broad range of pressures in that the control is accomplished by the pressure differential between the inside and outside of the fluid flow path.

FIG. 12 illustrates an alternate form for assuring there will be passageways for fluid flow through the nipple 27 around the shaft 41 and into the tube. The shaft 41 is provided with external flutings or knurling at 43 to separate the shaft from the interior surface of the nipple. When machined or formed as illustrated, fluid flow paths are provided through the void areas.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

What is claimed is:

1. In a pressure-controlled valve the improvement comprising:
   (a) a chamber in which the control pressure is applied, said chamber being formed within a complimentary pair of members having cut-out inner portions therein, with inlet and outlet ports at opposite ends of said cut-out inner portions and at least one control port communicating with said chamber through said members other than through said inlet and outlet ports;
   (b) an elastic-walled hollow tube traversing said chamber, there being no direct fluid current between said chamber and the interior of said tube, the sole communication between said chamber and said interior of said tube being through elastic diminution of the internal circumference of said hollow tube in response to relative fluid pressure increase of said control pressure in said chamber with respect to fluid pressure in said interior of said tube said hollow tube being supported within said chamber in cooperation with said inlet and outlet ports in a manner to establish said no direct fluid current between said chamber and the interior of said tube;

(c) a flow obstructing body within said hollow tube, said body having a substantially elliptic cross-section with the major axis of said elliptical cross-section being parallel to the axis of said hollow tube and the minor axis of said elliptical cross-section being perpendicular to the axis of said hollow tube, said body having a transverse cross-section circumference along said minor elliptical axis which is larger than the relaxed internal circumference of said hollow tube and smaller than the traverse dimension of at least a portion of said chamber throughout the entire length of said chamber parallel to the axis of said hollow tube;

(d) a flow conducting annulus being established between the exterior of said body and the interior wall of said tube by elastic expansion of said elastic-walled hollow tube into said chamber due to larger fluid pressure in the interior of said tube with respect to said control pressure in said chamber from said control port, said flow-conducting annulus between said body and the interior wall of said tube being diminishable by said elastic diminution of the circumference of said tube toward contact with said body in response to fluid pressure increase in said chamber from said control port, whereby the flow through said flow-conducting annulus is reduced substantially to zero when the fluid pressure in said interior of said tube drops below said control pressure in said chamber from said control port.

2. The pressure-controlled valve of claim 1 wherein said chamber completely surrounds said elastic-walled hollow tube, said chamber being larger in cross-sectional area than said tube at the location of said flow obstructing body, and said chamber being longer in axial dimension than said flow obstructing body within said tube.

3. The pressure-controlled valve of claim 1 wherein said valve comprises a substantially T-shaped body with fluid flow through the bar of said T-shape and control fluid pressure through the leg of said T-shape, said chamber and said tube being within said bar.

4. The pressure-controlled valve of claim 1 wherein said elastic-walled tube is supported within said chamber at each end thereof on hollow nipples and said flow obstructing body is supported within said tube on axial extensions of said body, said extensions extending into said hollow nipples, the cross-sectional configuration of said extensions and the bore within said hollow nipple being such as to permit fluid flow through said hollow nipple, around said extensions and along said flow-conducting annulus.

5. The pressure-controlled valve of claim 1 wherein said flow obstructing body has a substantially oval transverse cross-section with respect to the longitudinal axis of said hollow tube.

6. The pressure-controlled valve of claim 4 wherein said flow obstructing body has said substantially elliptical axial profile between said extensions and a substantially oval cross-section intermediate said extensions.

7. The pressure-controlled valve of claim 1 wherein said flow obstructing body has at least one exterior substantially flat surface and no angular corners perpendicular to said axis of said tube in said flow conducting annulus.

8. A pressure-controlled valve comprising (a) a body portion having an inlet conduit, an outlet conduit, a hollow portion between said inlet and outlet conduits, and a control conduit connected to said hollow portion;

(b) an insert adapted to be positioned within said hollow portion, said insert comprising complimentary elements defining an internal chamber, inlet, outlet and control ports into said chamber;

(c) a pair of end seal members adapted to be positioned within said hollow portion, one at each end of said insert and operating to position said insert in said body portion, pressure sealinbg means supported on said end seal members and cooperating with the interior surface of said hollow portion to effect said pressure seal, a nipple extending toward said hollow portion from each end seal, a passageway axially through each end sealing in alignment with and passing through said nipple;

(d) a compressible tube member, said tube member mounted to said nipple with said nipple extending internally into said tube, said tube being positioned between said complimentary elements of said insert with said nipple mounted portion within said inlet port at one end and said outlet port at the other end and with the central portion thereof within said internal chamber;

(e) a flow obstructing spreader positioned within said tube member, said spreader having a central body portion and finger-like extensions at each end of said body, said body having a substantially oval transverse cross-section at the geometric center thereof and a generally elliptical profile axially with said fingers extending beyond said generally elliptical form, said fingers being positioned within said nipples extending from said end seal members to support said spreader within said tube member while permitting fluid flow from said inlet conduit to said outlet conduit through said tube member between the interior circumferential surface of said tube and the exterior surface of said spreader;

(f) said control conduit through said body portion being in communication with said control ports of said chamber and the exterior circumferential surface of said tube whereby said pressure sealing means on said end seal members enclose said chamber to pressure supplied from said control ports and, when said control pressure exceeds fluid pressure within said tube member, said tube member is compressed against the external surface of said spreader to reduce substantially to zero the flow of fluid through said valve.

* * * * *

UNITED STATES PATENT AND TRADEMARK OFFICE
CERTIFICATE OF CORRECTION

PATENT NO. : 4,310,140
DATED : January 12, 1982
INVENTOR(S) : Daryl R. Boomer and Russell E. Boyer It is certified that error appears in the above-identified patent and that said Letters Patent are hereby corrected as shown below:

On the title page Item /73/ Assignee: should read:

-- Said Boomer Assors to Chevron Research Company San Francisco, California --.

Col. 6, Claim 8, line 7, "sealinbg" should read --sealing--.

Signed and Sealed this

Fifth Day of March 1985

[SEAL]

Attest:

DONALD J. QUIGG

Attesting Officer     Acting Commissioner of Patents and Trademarks